United States Patent [19]

Barquet et al.

[11] Patent Number: 5,024,399
[45] Date of Patent: Jun. 18, 1991

[54] FRAME MADE OF A COMPOSITE MATERIAL, ESPECIALLY FOR THE FUSELAGE OF AN AIRCRAFT, AND ITS METHOD OF PRODUCTION

[75] Inventors: Henri Barquet, Chateauneuf les Martigues; Pierre-Paul Negroni, Marseilles; Bernard Plissonneau, Aix en Provence, all of France

[73] Assignee: Societe Nationale Industrielle et Aetospatiale, Paris, France

[21] Appl. No.: 360,255

[22] Filed: Jun. 2, 1989

[30] Foreign Application Priority Data

Jun. 8, 1988 [FR] France ............................... 88 07638

[51] Int. Cl.$^5$ ............................................. B64C 1/10
[52] U.S. Cl. ..................................... 244/119; 244/120
[58] Field of Search ..................... 244/119, 120, 129.1, 244/123, 124; 52/630, 309.7, 309.1, 730

[56] References Cited

U.S. PATENT DOCUMENTS

| | | | |
|---|---|---|---|
| 1,803,494 | 5/1931 | Amiot | 244/119 |
| 1,880,481 | 10/1932 | Ragsdale | 244/119 |
| 1,881,296 | 10/1932 | Pofez | 244/119 |
| 2,965,336 | 12/1960 | Lissarrague | 244/119 |
| 3,976,269 | 8/1976 | Gupta | 244/119 |
| 3,995,080 | 11/1976 | Cogburn et al. | 52/630 |
| 3,995,081 | 11/1976 | Fant et al. | 52/630 |
| 4,367,260 | 1/1983 | Krause | 428/287 |
| 4,531,695 | 7/1985 | Swinfield | 244/119 |

FOREIGN PATENT DOCUMENTS

| | | |
|---|---|---|
| 2622163 | 5/1976 | Fed. Rep. of Germany . |
| 2134059 | 1/1983 | United Kingdom . |
| 2196922 | 5/1988 | United Kingdom . |

Primary Examiner—Joseph F. Peters, Jr.
Assistant Examiner—Anne E. Bidwell
Attorney, Agent, or Firm—Pearne, Gordon, McCoy & Granger

[57] ABSTRACT

In order to reinforce a working hull, such as the fuselage of an aircraft and in particular that of a helicopter, a frame (C) is embodied made of a composite material in the form of a monolithic monobloc structure. This structure is constituted by a profile whose internal flange (16) and the external half-flanges (18) principally comprise unidirectional fibers which extend over its entire length. As a variant, the lower section of the frame is embodied separately in the form of a panel bordered over its entire periphery by lateral half-flanges which also principally comprise unidirectional fibers. After assembling the two sections of the frame, the half-flanges are then opposite each other in the elongation.

14 Claims, 7 Drawing Sheets

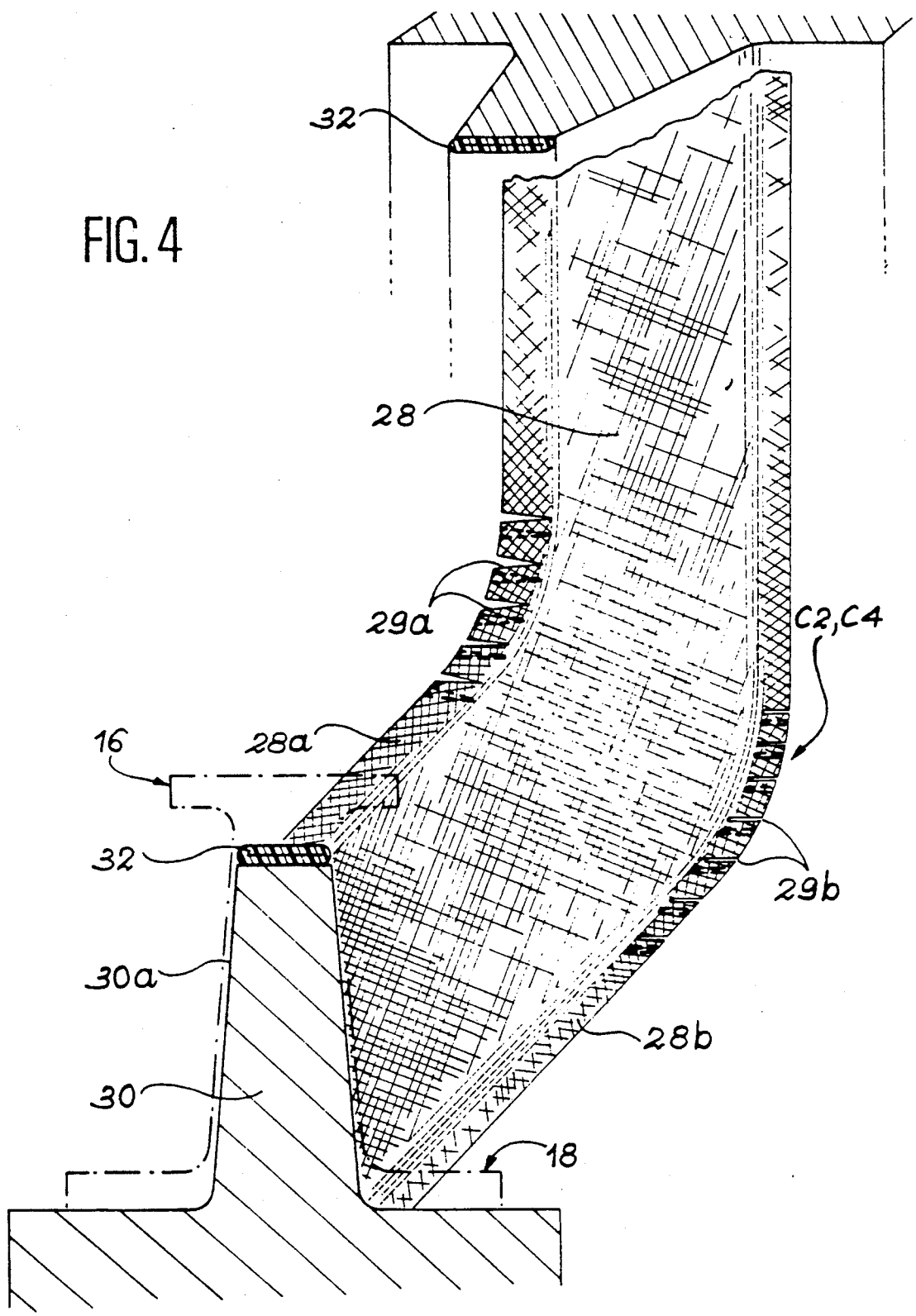

FRAME MADE OF A COMPOSITE MATERIAL, ESPECIALLY FOR THE FUSELAGE OF AN AIRCRAFT, AND ITS METHOD OF PRODUCTION

FIELD OF THE INVENTION

The invention concerns a frame made of a composite material intended to reinforce a structure, such as the fuselage of an aircraft and in particular that of a helicopter. The invention also concerns a method to produce such a frame.

BACKGROUND OF THE INVENTION

In rotary wing aircraft, such as helicopters, and fixed wing aircraft, the fuselage, whose structure is essentially a hull, may be required to bear localized stresses requiring the presence of one or more frames to distribute these stresses inside the working structure. In the case of a helicopter, frames such as these, especially reinforcement frames, are usually used for fixing the engine or engines and the transmission units to the rotor on the top of the fuselage. In fixed wing or rotary wing aircraft, reinforcement frames may also be used to fix the resistant elements of the undercarriage.

As shown in detail in the document FR-A-2 539 701, the method is known for producing the fuselage of a helicopter and in particular the reinforcement frames of this fuselage made of a composite material constituted by carbon fibers embedded in a plastic mould.

In this document, each of the frames includes two vertical struts and two horizontal crosspieces whose extremities are fixed to the extremities of the vertical struts. The struts and the crosspieces comprise a casing made of a composite material encompassing a honeycomb-shaped material. More precisely, the casing of the vertical struts has a cross section in the form of a high-shaped cap closed to the outside by a composite strip, whereas the casing of the horizontal crosspieces is formed of two U-shaped sections disposed back-to-back and connected by two composite strips. The assembling between the lateral beams and the horizontal beams is effected by glueing by making the extremities of the vertical struts penetrate into the recessed sections of the extremities of the horizontal crosspieces.

A reinforcement frame embodied in this way presents a number of drawbacks. Thus, the conception described only makes it possible to embody frames whose shape is approximately rectangular and is not applicable to frames having a different shape, said shape being, for example, circular or polygonal. Furthermore, the segmenting into three elements of the upper portico-shaped section of the frame results in discontinuities in the transmission to the entire frame structure of localized stresses applied to the latter, for example at locations used for the fixing of the main transmission box or the resistant devices of the undercarriage. Moreover, the positioning of the braces bearing these localized stresses has not been proved to be satisfactory. Finally, the flanges of the vertical struts of the frame are suddenly interrupted when these struts are connected onto the lower beam, which increases the structural discontinuity of the frame.

In addition, the document U.S. Pat. No. 4,593,870 describes a structure designed to constitute the lower part of the fuselage of an aircraft, such as a helicopter. This structure includes two webs made of a composite material between which placed is an alveolar material. In the lower part of the structure, the webs present deformations constituting the starts of folding bucklings when the structure of the fuselage is compression-stressed in a vertical direction under the effect of an impact of this structure at high speed.

SUMMARY OF THE INVENTION

The main object of the invention is to provide a structural frame made of a composite material, in particular for the fuselage of an aircraft, designed to overcome the drawbacks of the reinforcement frame described in the document FR-A-2 539 701, this frame able to have any shape and making it possible to provide improved transmisison in the web and flanges of the frame of localized stresses exerted on the braces fixed to this frame, as well as rendering it easier to place these braces.

According to the invention, this result can be obtained by means of a frame for the working hull, especially for the fuselage of an aircraft, wherein it has at least partly a monolithic structure constituted by a section made of a composite material formed of fibers with high mechanical resistance agglomerated by a hardened synthetic resin and presenting as a section an internal flange, two external half-flanges and two webs connecting the internal flange to each external half-flange, the internal flange and the external half-flanges being mainly constituted by laps of unidirectional fibers extending longitudinally without discontinuity inside the section and the webs of the section being formed by fabrics made up of multidirectional fibers and connecting the internal flange to each external half-flange.

This configuration makes it possible to provide good stability on buckling of the frame in the two main planes, allows for its embodiment by moulding and facilitates the installing of braces for introducing stresses and fixing the working casing of the hull.

Advantageously, the two webs connecting the internal flange to the two external half-flanges form between them an acute angle open between the two external half-flanges and the internal flange and the external half-flanges are perpendicular to a plane of symmetry of the frame containing the bisector of said acute angle.

The monolithic structure thus defined may constitute a monobloc structure forming all of the reinforcement frame. On the other hand, when it is necessary to provide one lower part of the frame with characteristics enabling it to ensure absorption of the energy induced by the impact of the frame against the ground, only one upper portico-shaped part of the frame presents a monolithic structure.

In this case, the lower crosspiece-shaped part includes a panel bordered over its entire periphery with two lateral half-flanges.

Preferably, each lateral half-flange principally contains unidirectional fibers extending without discontinuity over the entire length of the panel forming the lower crosspiece.

In this case, the panel includes two parallel webs formed of fabrics of multidirectional fibers and delimiting between them a space filled with a ductile material, such as foam or an alveolar material. Deformations are preferably formed in the lower parts of the webs of the panel along a longitudinal direction of the lower crosspiece-shaped part so as to facilitate the absorption of energy in the event of impact.

So as to ensure the assembling of the two parts of the frame without interrupting the continuity of the half-flanges constituting the outside of the latter, the upper portico-shaped part includes extremities deprived of flanges fixed in recesses formed in extremities of the panel forming the lower crosspiece and opening between the lateral half-flanges so that the latter are located in the elongation of the external half-flanges of the upper portico-shaped part.

The object of the invention is also to provide a method to produce a working hull frame, especially the fuselage of an aircraft, wherein the frame is at least partly embodied in the form of a monolithic structure by:

the draping of unidirectional and multidirectional fabrics impregnated with resin over a form delimiting the outer contour of a profile having as a section an internal flange, two external half-flanges and two webs connecting the internal flange to each external half-flange, these webs forming between then an acute angle open between the external half-flanges, the unidirectional fabrics forming the internal flange and the external half-flanges and the multidirectional fabrics connecting the internal flange to each external half-flange and forming the webs of the profile;

the closing of a mould comprising said form, inflatable bladders and a counter-form;

the inflating of the bladders so as to compress the fabrics and heat-polymerize the resin impregnating the fabrics;

removing said monolithic structure from the mould.

BRIEF DESCRIPTION OF THE DRAWINGS

There now follows a description, given by way of example in no way restrictive, of two embodiments of the invention with reference to the accompanying drawings in which:

FIG. 4 is a perspective view illustrating the putting into place of the various layers of fabrics constituting the webs of the section forming the frame in the bending inward zones of the latter inside the mould of FIG. 3;

FIGS. 91, 9B and 9C are sections along the lines A—A, B—B and C—C of FIG. 8.

DETAILED DESCRIPTION OF THE PREFERRED EMBODIMENTS

Figure 1:
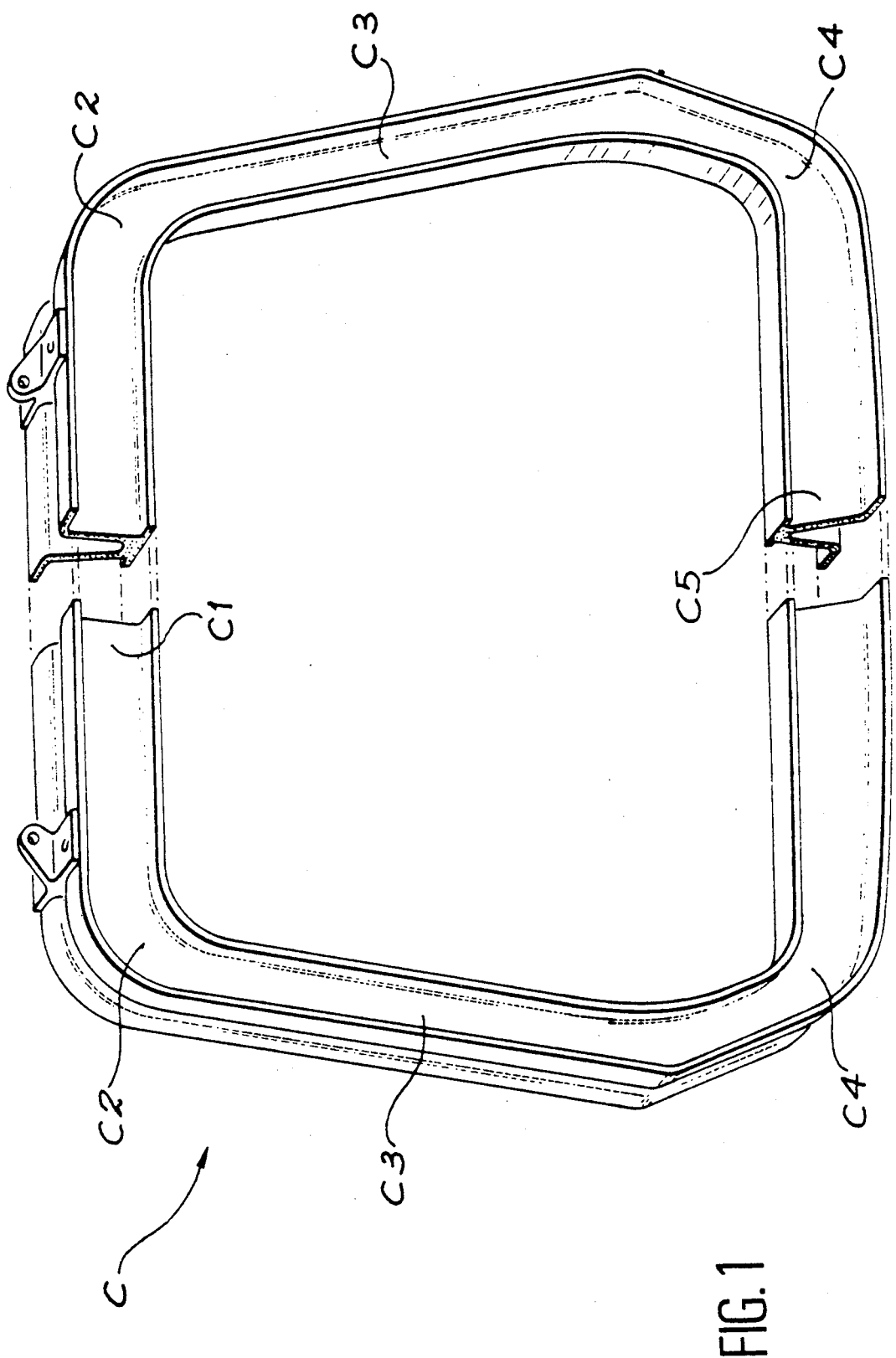
FIG. 1 is a perspective view with dentelations representing a monobloc monolithic reinforcement frame produced in accordance with a first embodiment of the invention.

FIG. 1 shows a frame C made of a composite material intended to reinforce the hull constituting the fuselage of an aircraft, such as a helicopter. In the embodiment shown, this frame roughly has the shape of a rectangle whose angles are rounded. However, it shall be understood that the technique for embodying this frame according to the invention enables it to be given any other form adapted to the envisaged application, such as a circular or polygonal shape.

In the embodiment represented on FIG. 1, the frame C is fully embodied in a monolithic monobloc form. According to the invention, this monolithic structure is constituted by a section made of a composite material. The profile constituting the frame C includes an upper horizontal portion C1 whose extremities are extended by two approximately right angle curved portions C2 orientated towards the bottom and themselves extended by two approximately vertical portions C3 having slight concavity towards the inside of the frame and being of equal length. The lower extremities of the portions C3 are extended by two approximately right angle curved portions C4 themselves extended by a lower horizontal portion C5 closing the frame. The frame thus constituted has a vertical plane of symemetry approximately merged with the plane of FIG. 1.

The structure of the profile constituting the frame C shall now be described in more detail by referring to FIG. 2, which diagrammatically shows on a larger scale a cross section of this profile in the upper horizontal portion C1.

Figure 2:
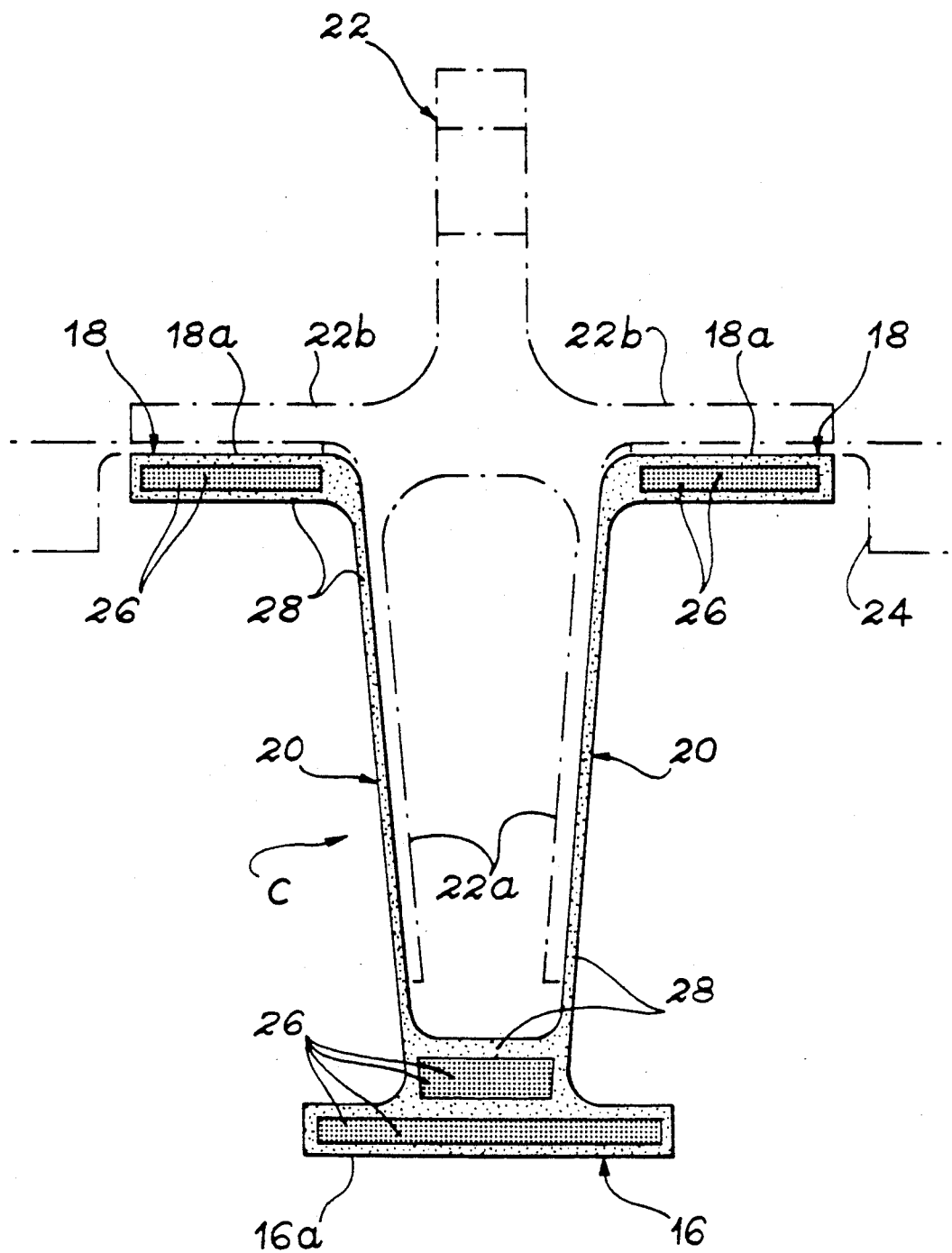
FIG. 2 is a cross section of the frame of FIG. 1, the structure of the flight deck and a fixing attachment being shown by the dot-and-dash lines.

As shown by the section of FIG. 2, the profile constituting the frame C has an internal flange 16, two external half-flanges 18 and two webs 20 connecting the internal flange 16 to each of the external half-flanges 18.

More precisely, the internal flange 16 comprises a central part located between the webs 20 and wings which laterally project beyond the webs 20. Also, the flange 16 is delimited interiorally by a surface 16a perpendicular to the vertical plane of symmetry of the frame defined previously. The surface 16a is thus flat in the portions C1 and C5 of the frame.

The webs 20 are orientated outwardly from the internal flange 16 and are progressively moved away from the vertical plane of symmetry of the frame along two directions symmetrical with respect to this plane and delimiting between them a very small acute angle open towards the outside of the frame between the two external half-flanges 18. Thus, the bisectrix of the angle formed by the webs 20 is contained within the plane of symmetry of the frame.

The external half-flanges 18 are disposed inside the elongation of each of the webs 20 and are orientated along a direction perpendicular to the vertical plane of symmetry of the frame by moving them away from this plane. The half-flanges 18 are delimited towards the outside of the frame by surfaces 18a perpendicular to the vertical plane of symmetry of the frame and located opposite each other in the elongation. Thus, in the rectilinear portions C1 and C5 of the frame, the outer surfaces 18a are flat surfaces.

The section of the profile constituting the frame C is uniform over the entire periphery of the latter. However, the lengths of the webs 20 may differ between the various portions C1 to C5. Thus as shown on FIG. 1, the length of the webs 20 may assume its largest value in the lower portion C5, its smallest value in the portions C3, and an intermediate value in its upper part C1. In this case, the change of length of the webs is effected progressively in the curved portions C2 and C4. On the other hand, the dimensions of the internal flange 16 and the external half-flanges 18 are the same over the entire periphery of the frame.

The particular section of the profile constituting the monolithic monobloc frame of FIG. 1 makes it possible to ensure good stability to buckling of the structure thus constituted.

Furthermore and as shown by the dot-and-dash lines on FIG. 2, this section allows for easy putting in place and positioning of the braces 22 to be used in particular for the fixing of the main transmission box when the frame equips a helicopter. In fact, the braces 22, which are generally metallic, then comprise a section 22a complementary to the recess formed between the webs 20 and whose placing inside this recess immediately ensures correct positioning of the brace inside the vertical plane of symmetry of the frame.

The fixing braces 22 also comprise in a known way two wings 22b to be applied to the outer faces 18a of the external half-flanges 18. Fixing of the braces is ensured by any suitable means, such as bolts or rivets traversing both the wings 22b of the braces and the external half-flanges 18 of the profile constituting the frame.

As also represented by the dot-and-dash lines on FIG. 2, the external half-flanges 18 of the profile constituting the frame C are also used to fix the working casing of the hull structure 24 of the aircraft, itself also generally being made of a composite material. To this effect, the structure 24 presents at the location of the frame C parts with less thickness to be applied to the outer surfaces 18a of the external half-flanges 18, the fixing of the structure 24 onto the latter being provided by any suitable means and in particular by glueing or riveting.

As already mentioned, in the embodiment of FIG. 1, the frame C is embodied in the form of a monolithic monobloc structure made of a composite material. More precisely, the internal flange 16 and the two half-flanges 18 are mainly formed of unidirectional fibers 26, for example in the form of bands or strips of fabrics embedded in a resin mould and extending longitudinally without discontinuity inside the profile constituting the frame. The internal flange 16 thus includes a first core of unidirectional fibers 26 extending over the entire width of the flange close to the surface 16a, and a second core of fibers 26 extending between the webs 20 to the base of the latter. Similarly, each external half-flange 18 includes a core of unidirectional fibers 26 extending over the entire width of the half-flange.

The rest of the profile constituting the frame C, that is mainly the webs 20 and the parts of the flange 16 and of the half-flanges 18 encompassing the cores of unidirectional fibers 26, is made up of fabrics of bidirectional fibers 28 embedded in a resin mould.

The nature of the unidirectional fibers 26 and the fibers constituting the fabrics 28, as well as the nature of the resin in which these fibers are embedded, are selected according to the envisaged application from those fibers and resins normally used in composite material applications. Accordingly, the fibers may be carbon fibers and the resin may be a duroplastic resin, such as a phenolic or epoxy type resin.

The monolithic monobloc frame C, which has just been described with reference with FIGS. 1 and 2, is produced in a mould shown by FIG. 3, this mould being conceived so as to allow for the compression of the fabrics impregnated with resin at the time of the cycle for heat-polymerizing the resin.

Figure 3:
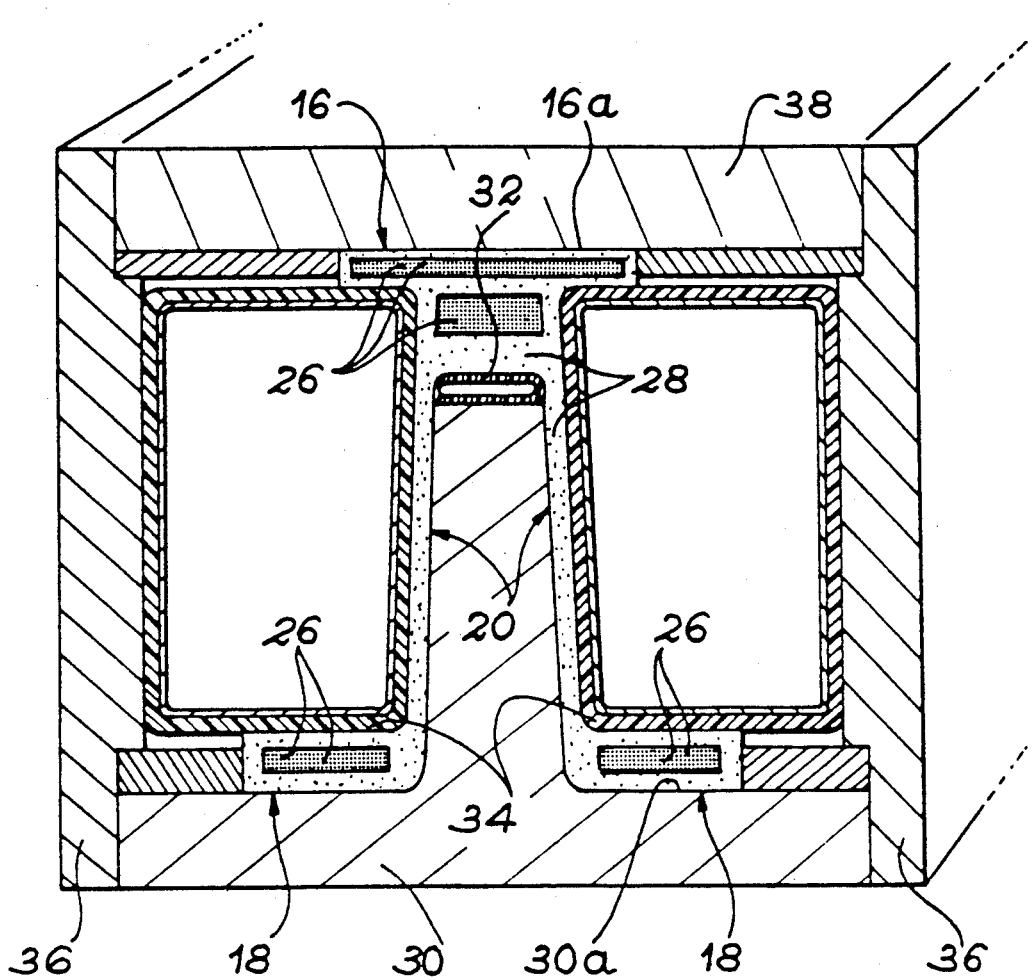
FIG. 3 is a perspective and cutaway cross sectional view representing a mould being used for the production of the reinforcement frame according to the invention.

The mould represented on FIG. 3 firstly includes a form 30 whose surface 30a orientated towards the inside of the mould has a shape complementary to the outer shape of the frame C to be made. With the mould being open, the bidirectional tissues 28 and the unidirectional fibers 26 preimpregnated with resin are draped over the surface 30a of the form 30. This draping operation, normally effected for the production of composite materials, is generally carried out by hand.

In the present case, so as to facilitate their placing, the unidirectional fibers 26 impregnated with resin are placed on a support film which makes it possible to handle them as a fabric, no mechanical function being involved when the production is ended. The unidirectional fibers 26 thus may be draped as fabrics in successive layers so as to form the cores of the internal flange 16 and the external half-flanges 18. This draping is carried out on the form 30 in the direction of the length of the profile constituting the frame C without cutting or discontinuity. This characteristic is made possible by the fact that the flange and half-flanges are orientated perpendicular to the vertical plane of symmetry of the frame and presenting a uniform section.

The draping of the bidirectional fabrics 28 impregnated with resin is also carried out in the direction of the width of the profile constituting the frame C. The number of fabric layers constituting the webs 20 and the number of layers of unidirectional fibers 26 are determined so as to give the profile the desired mechanical resistance characteristics.

The bidirectional fabrics constituting the webs 20 of the profile may be draped from several fabric outputs according to industrial availabilities. In this case, the continuity of the structure is ensured by an overlapping of the fabrics. So as to avoid a significant local variation of thickness, the coverings are offset with respect to one another.

Given the fact that the bidirectional fabrics which form the webs 20 provide the linkage between the internal flange 16 and the external half-flanges 18, the lateral edges of these fabrics are necessarily folded up onto the parts of the form 30 corresponding to the internal flange and the external half-flanges.

As illustrated on FIG. 4, in the curved portions C2 and C4 of the frame C, the length of the edge 28a of each fabric 28 folded up towards the internal flange 16 is less than the length of fabric actually required. Accordingly, divergent notches 29a are made in the edge 28a of the fabric folded up onto the parts of the form 30 corresponding to these curved portions C2 and C4.

On the other hand, in the curved portions C2 and C4, the length of the edge 28b of each fabric 8 folded up towards the external half-flange 18 is greater than the length of fabric actually required. Notches 29b are thus made in the edge 28b of the fabric folded up onto the parts of the form 30 corresponding to these curved portions C2 and C4 and the fabric excess amounts are removed.

As also illustrated on FIG. 4, the notches 29a and especially 29b are made so as to be offset between each layer of fabric 28 so that there is no overlapping of the notches at the time of stacking.

By referring to FIG. 3, it can be seen that, before starting to drape the fabrics with bidirectional fibers 28 and the unidirectional fibers 26 onto the form 30, placed on the latter in its central part located between the webs and corresponding to the internal flange is an inflatable bladder 32 which has initially been deflated.

When draping is ended, two armature bladders 34 are placed on both sides of the webs 20, each of the bladders 34 also resting on the corresponding external half-flange 18 and on the projecting wing of the internal flange 16. These bladders are also deflated when they are put in position, but their armature enables them to keep in place the various layers of fabric before they are inflated.

The mould is then closed by the placing of a counter-form constituted by two lateral plates 36 which are secured to the outer edges of the form 30 and rests on the outer faces of the armature bladders 34 and by the placing of an internal peripheral part 38 composed of several sections secured to the parts 36 and which rests on the surface 16a of the internal flange 16.

The bladders 32 and 34 are then pressurized so as to compress the various layers of fabrics preimpregnated with resin contained in the mould and heat-polymerizing of the resin is effected by conventional techniques.

At the end of polymerization, the bladders are deflated and the mould is opened so as to extract the monolithic monobloc frame C shown in FIG. 1.

Figure 5:
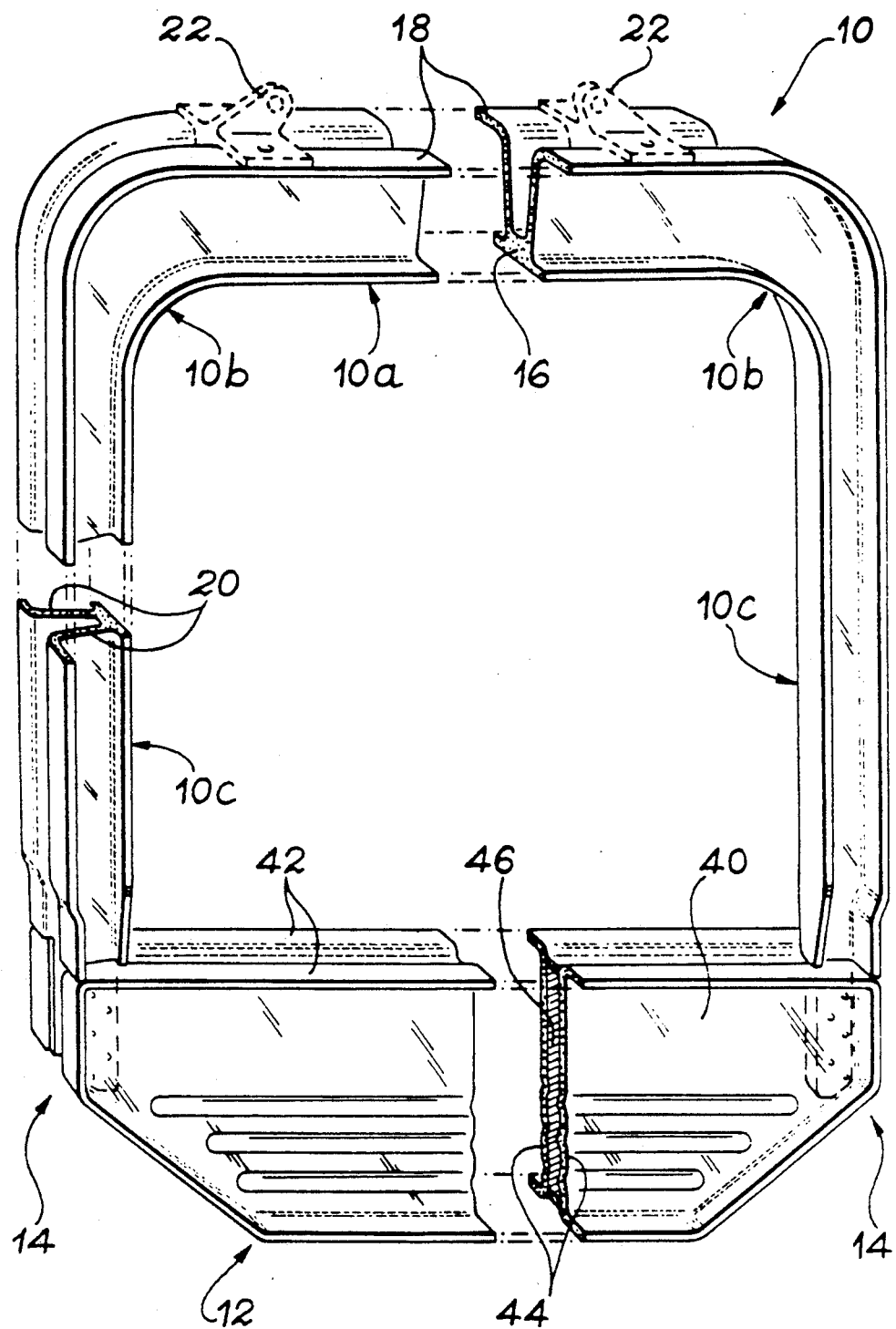
FIG. 5 is a perspective view similar to that of FIG. 1 and illustrating a second embodiment of the invention in which the reinforcement frame includes an upper portico-shaped monolithic part and a lower crosspiece-shaped part embodied separately.

In a second embodiment of the invention to be described now with reference to FIG. 5, instead of being fully embodied in the form of a monolithic monobloc structure, the reinforcement frame according to the invention is formed of two separate parts embodied separately which are then assembled by suitable means.

More precisely, the reinforcement frame is, in this instance, constituted by an upper portico or arch-shaped section 10 and by a lower crosspiece-shaped section 12, the adjacent extremities of these two sections being connected together by assembling means 14 so as to form a closed frame.

In this embodiment of FIG. 5, the upper portico-shaped section 10 is a profile made of a composite material and having according to the invention a monolithic structure from one extremity to the other. The profile constituting the upper section 10 includes an upper horizontal portion 10a whose extremities are extended by two right angle curved portions 10b orientated towards the bottom, said portions themselves being extended by two vertical portions 10c parallel to each other and being of equal length.

The section of the profile constituting the upper portico-shaped part 10 is identical to the section of the frame C previously described with reference to FIG. 2 in the case of the first embodiment of the invention, except for the lower extremities of the vertical portions 10c.

Similarly, the embodiment of the upper portico-shaped section of the frame of FIG. 5 is identical to the embodiment of the frame C described previously with reference to FIGS. 3 and 4 with regard to the first embodiment of the invention.

Figure 6:
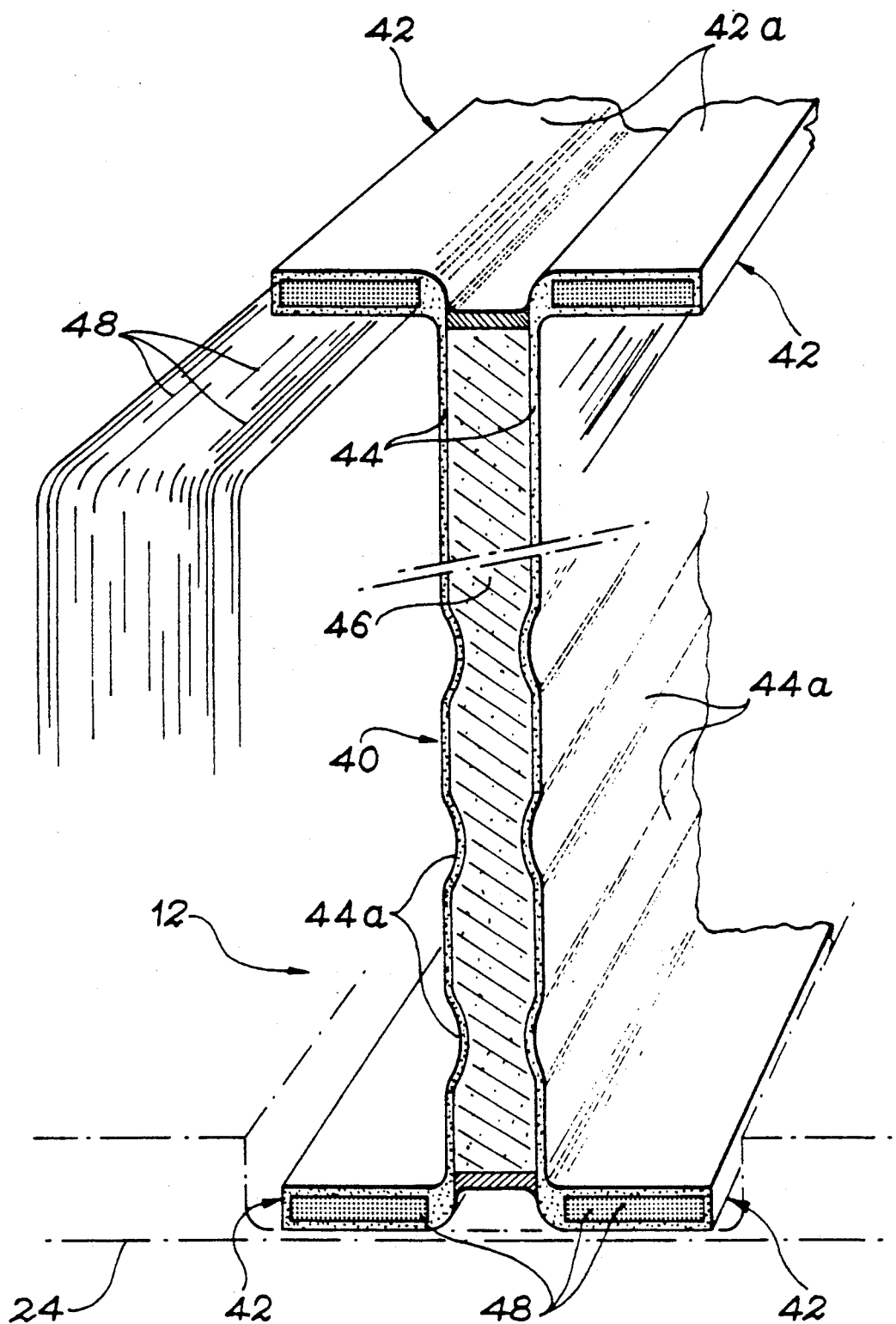
FIG. 6 is a cross section and perspective view of the lower crosspiece-shaped part of the frame of FIG. 5.

The structure of the lower crosspiece-shaped part 12 shall now be described in more detail with reference to FIG. 6, which illustrates a vertical section of this part 12.

The lower crosspiece-shaped part 12 is mainly constituted by a roughly flat vertical panel 40 which extends between the lower extremities of the vertical portions 10c of the upper part 10 and whose thickness is close to the distance separating the webs 20 of the profile constituting this part 10. As shown on FIG. 5, the panel 40 has the shape of a rectangle whose two lower angles are truncated.

More precisely, the panel 40 has a sandwich structure, that is it is made up two thin parallel vertical webs 44 defining between them a space filled with a ductile material, so that they adhere to a honeycombed-shaped structure or foam 46.

The panel 40 is bordered over its entire periphery with two lateral half-flanges 42 orientated perpendicular to the panel 40 and extending the webs 44 by distancing them from the vertical plane of symmetry of the frame. The half-flanges 42 are delimited externally by surfaces 42a orientated perpendicular to this plane of symmetry and disposed opposite each other inside the elongation.

At the lower part of the panel 40, as in the upper part of this panel, the half-flanges 42 are orientated parallel to each other along a roughly horizontal direction so as to constitute two rigid parallel elements ensuring a compression-loading of the panel 40 evenly distributed on the surface. Thus, in the event of accident, the greatest possible absorption of energy is obtained.

Moreover, at each extremity of the panel 40 and in the top part of the latter, the half-flanges 42 are orientated parallel to each other and along a roughly vertical direction. These parts of the half-flanges 42 may thus be placed inside the extension or prolongation of the external half-flanges 18 of the part 10 of the frame, as shall be seen subsequently.

Preferably, the lateral half-flanges 42 have a monolithic structure with a rigid section and are mainly made up of unidirectional fibers 48 embedded in a duroplastic resin mould. The fibers 48 extend without discontinuity over the entire circumference of the panel 40 so as to form a core in each half-flange 42. The webs 44 are connected to the corresponding half-flanges 42 and are embodied by fabrics of bidirectional fibers embedded in a resin mould. The remarks previously made with reference to the fibers and the resin constituting the frame C in the embodiment of FIG. 1 and the upper part 10 of the frame in the embodiment of FIG. 5 are also applicable to the lower part 12 of the frame as regards this latter embodiment.

The lateral half-flanges 42 located at the extremities and at the bottom of the panel 40 allow for the fixing by glueing and riveting of the structure 24 forming the working hull of the aircraft, the same applying for the half-flanges 18 in the upper part 10 of the frame.

Preferably, the webs 44 of the panel 40 have, in its lower part, undulations 44a orientated along a horizontal approximately longitudinal direction between the extremities of the lower crosspiece-shaped part 12. This particular structure makes it possible to obtain via the start of buckling a controlled deformation of the part 12 of the frame if this part suddenly strikes the ground. In fact, the energy of the impact is transmitted through the bottom of the part 12 of the frame to the ductile web 40 without the resistance of the web being reduced during the flight or in normal landing conditions.

Figure 7:
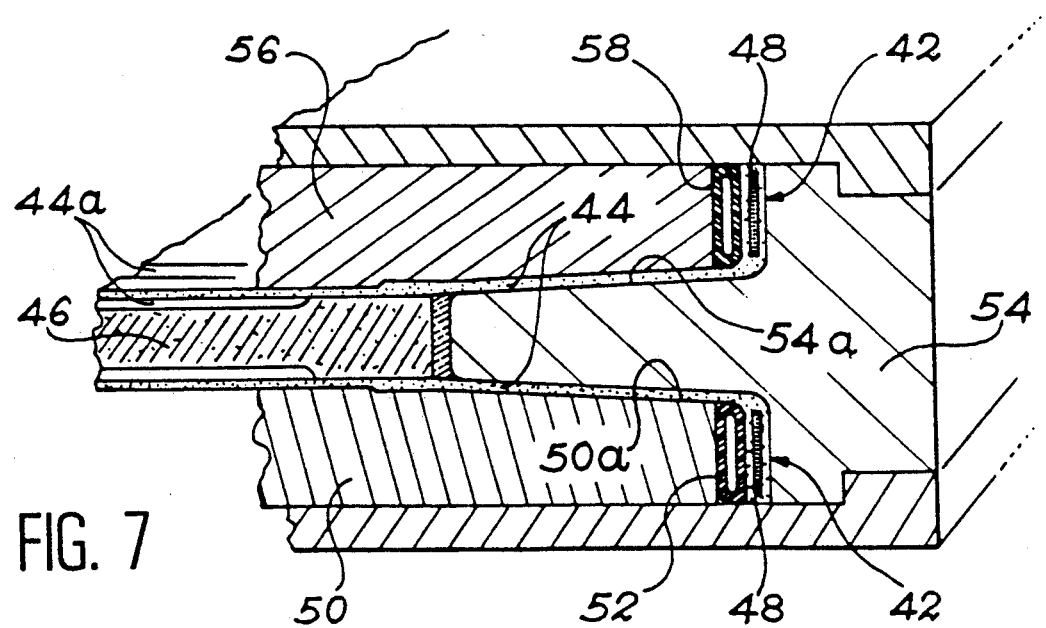
FIG. 7 is a perspective and cutaway cross section view representing a mould used for the production of the lower crosspiece-shaped part shown on FIG. 6.

The lower crosspiece-shaped part 12 is also embodied in a mould, as illustrated diagrammatically on FIG. 7. The general principle for producing this part 12 is the same as that of the frame C (and of the part 10) described previously with reference to FIG. 3 and thus shall not be described further in detail. For purposes of clarity, there now follows a simple indication of the main stages of production and the various elements constituting the mould.

With the mould being initially open, only one form 50, whose upper face 50a is complementary to one of the sides of the panel 40 bordered by one of the half-flanges 32, is in place. The peripheral edge of this form 50 is encompassed by an inflatable bladder 52 which has initially been deflated. Then, according to the technique previously described in detail, the web 44 corresponding to this side of the panel 40 and the lateral half-flange 42 are embodied by draping. In order to facilitate the placing of the unidirectional fibers 48 constituting the core of the lateral half-flange, the fibers 48 are preferably linked together by a support film enabling them to be draped like a fabric. Given the fact that the flange 42 is perpendicular to the plane of symmetry of the frame, this draping can be effected without cutting or discontinuity, which guarantees the monolithic nature of the half-flanges 42.

The alveolar structure or foam 46 constituting the central part of the panel 40 is then put in place, as well as a second form 54, possibly consisting of several parts and whose internal surface 54a is complementary to the external peripheral surface of the crosspiece-shaped part 12. A new draping operation is carried out so as to produce the second web 44 of the panel and the second half-flange 42.

Finally, a counter-form 56, symmetrical to the form 50 and whose peripheral edge is encompassed with an initially deflated inflatable bladder 58 and identical to the inflatable bladder 52, is placed so as to close the mould. The bladders 52 and 58 are then inflated and hot polymerization is carried out according to conventional techniques.

The undulations 44a formed in the webs 44 are directly obtained by moulding by virtue of complementary deformations formed in the form 50 and in the counter-form 56.

After opening of the moulds of FIGS. 3 and 7, the parts 10 and 12 are assembled by means of the assembling means 14, this assembling now to be described with reference to FIGS. 8 and 9.

Figure 9A:
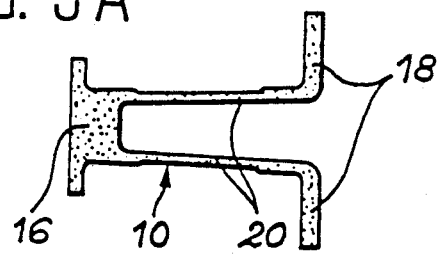
Figure 9B:
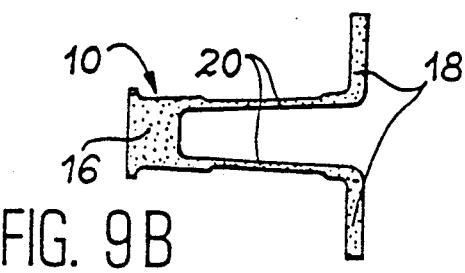
Figure 9C:
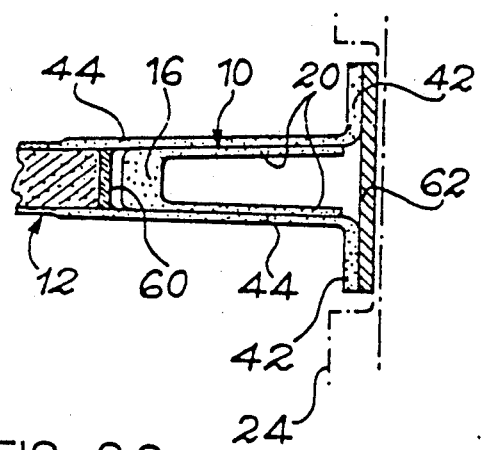
Figure 8:
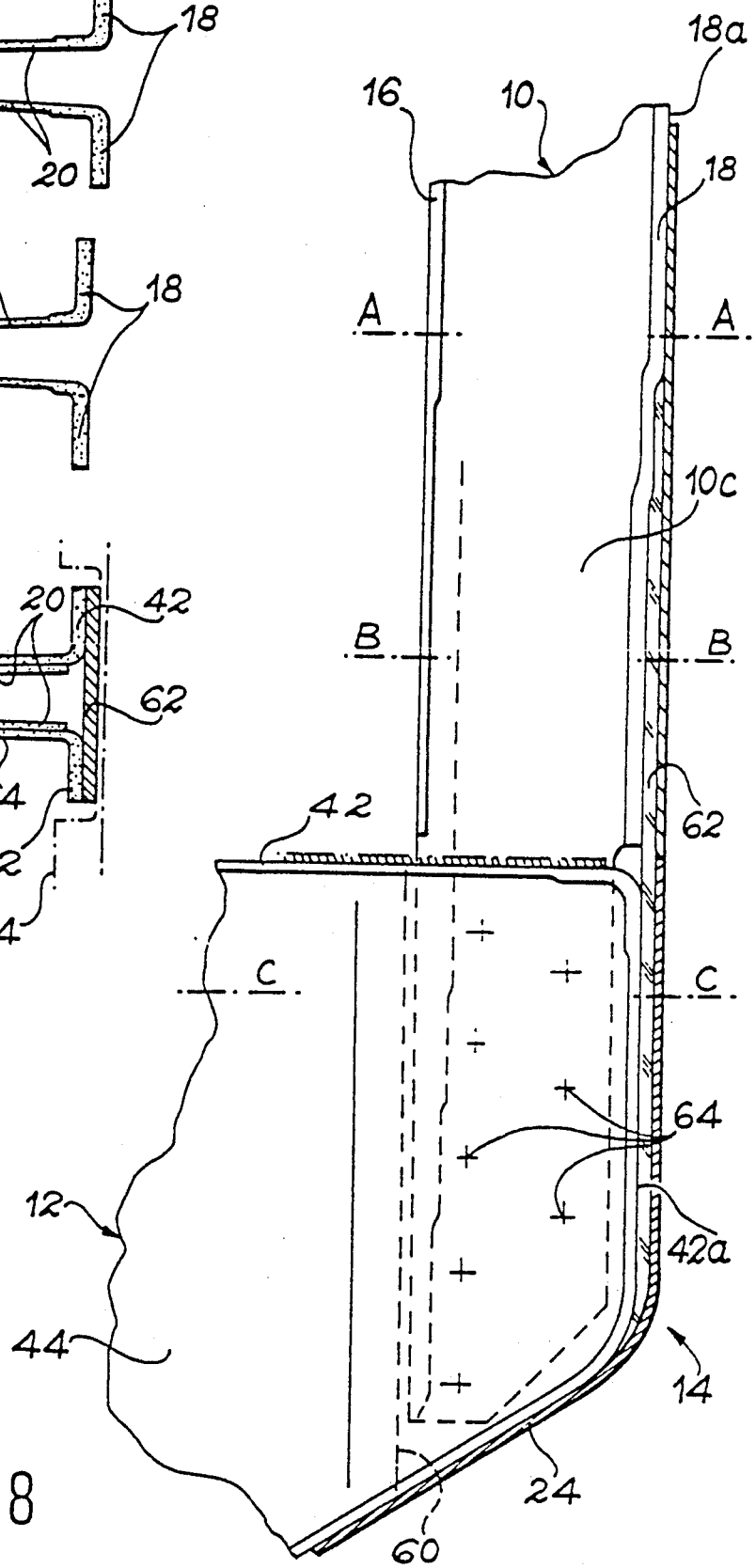
FIG. 8 is a front view illustrating the linkage of the extremities of the upper portico-shaped part onto the extremities of the lower crosspiece-shaped part.

As shown in particular on FIG. 8 and FIG. 9c, at each of the lower extremities of the vertical portions 10c of the part 10 of the frame, the external half-flanges 18 and the parts projecting from the internal flange 16 are totally suppressed over a certain length. Also, at each of the longitudinal extremities of the lower part 12 of the frame, a recess 60 open towards the outside is provided between the webs 44 of the panel. The dimensions of the recesses 60 are such that the extremities deprived of the flanges of the vertical portions 10c fully penetrate into these recesses. In particular, the depth of each recess 60 is slightly greater than the thickness of the extremities of the portions 10c and the webs 44 are progressively moved apart by the same angle as that of the webs 20 so that the latter comes to be virtually housed without clearance in the recesses 60.

As illustrated by the sections represented on FIGS. 9A to 9C, the width of the projecting parts of the internal flange 16 of the part 10 of the frame gradually reduces when the lower extremities of this part 10 draw nearer so as to totally disappear just before these extremities penetrate into the recesses 60. In addition and as can be seen on FIG. 8, the thickness of these projecting parts of the internal flange 16 is reduced in the areas adjacent to the lower part 12.

In addition, the external half-flanges 18 of the part 10 are suddenly interrupted just before the extremities of the portions 10c penetrate into the recesses 60 and these half-flanges 18 are placed in the elongation of the vertical parts of the half-flanges 42 of the lower part 12, as clearly shown on FIG. 8. Moreover, close to the extremities deprived of the flanges of the portions 10c, the external half-flanges 18 comprise standing back parts which progressively draw nearer to the internal flange 16 so as to allow for the placing of a fishplate 62 whose outer surface is located inside the elongation of the outer surfaces 18a of the half-flanges 18 and 42a of the half-flanges 42 without discontinuity, as illustrated on FIG. 8. The fishplate, itself made of a composite material, is secured, for example, by bolts (not shown), firstly to the standing back parts of the half-flanges 18, and secondly to the parts of the half-flanges 42 located at the extremities of the lower part 12. This thus ensures continuity of the frame external half-flanges secured to the structure 24 of the working hull.

The fixing of the extremities of the part 10 into the extremities of the part 12 may be achieved by means of bolts 64 traversing the webs 20 and 44 of these two parts.

So as in particular to support the floor of the aircraft, horizontal beams (not shown) may be fixed to the lower crosspiece-shaped part 12 of the frame, for example by means of angles, preferably also made of a composite material. The fixing of these angles onto the panel 40 may be effected by any suitable means, such as screws, rivets or by glueing. In the lower part of the panel comprising the undulations 44a, this fixing is effected solely by means of rivets so as to avoid a corner effect prejudicial to a controlled crushing of this panel at the time of an accident.

Of course, the invention is not merely limited to the embodiment just described by way of example, but covers all variants of this.

In particular, the bidirectional fabrics forming the webs 20 and 44 may be replaced by multidirectional fabrics made up of threads orientated along three or four different directions.

What is claimed is:

1. Frame made of a composite material for a working hull, especially for the fuselage of an aircraft, wherein said frame has, at least in a part of its length, a monolithic structure constituted by a profile made of a composite stratified material formed of fibers with high mechanical resistance, said fibers being pre-impregnated by a hardened synthetic resin, said profile having in section an internal flange, two external half-flanges parallel to the internal flange and two webs connecting the internal flange to each external half-flange, the internal flange and the external half flanges mainly being constituted by laps of unidirectional fibers extending longitudinally without discontinuity on the whole length of the frame inside the profile, and the webs of the profile being formed by laps of fabrics made up of multidirectional fibers, these laps of fabrics covering the internal flange and the external half-flanges to connect the latter.

2. Frame according to claim 1, wherein the two webs which connect the internal flange to the two external half-flanges form between them an acute angle open between the two external half-flanges and wherein the internal flange and the external half-flanges are perpendicular to a plane of symmetry of the frame containing the bisectrix of said acute angle.

3. Frame according to claim 1, wherein the profile made of a composite stratified material extends on the whole length of the frame.

4. Frame according to claim 1, wherein said frame includes an upper portico-shaped part presenting a profile made of a monolithic stratified material and a lower crosspiece-shaped part whose extremities are connected by assembling means to the internal flange, external half-flanges and webs.

5. Frame according to claim 4, wherein the lower crosspiece-shaped part includes a panel bordered over its entire periphery with two lateral half-flanges.

6. Frame according to claim 5, wherein the lateral half-flanges are perpendicular to a plane of symmetry of the frame.

7. Frame according to claim 4, wherein the extremities of the upper portico-shaped part are deprived of the flange and are fixed in the recesses formed in the extremities of the panel and open between the lateral half-flanges so that the latter are located in the elongation of the external half-flanges of the upper portico-shaped part.

8. Frame according to claim 7, wherein the internal flange of the upper portico-shaped part includes projecting wings whose width progressively reduces close to the extremities deprived of the flanges of this upper part.

9. Frame according to claim 7, wherein the external half-flanges comprise standing back parts progressively drawing nearer to the internal flange close to the extremities deprived of the flanges of the upper portico-shaped part, fishplates being secured to these standing back parts of the external half-flanges and to adjacent parts of the lateral half-flanges.

10. Frame according to claim 5, wherein the panel includes two parallel webs delimiting between them a space filled with a ductile material.

11. Frame according to claim 10, wherein undulations are formed in the lower parts of the webs of the panel along a longitudinal direction of the lower crosspiece-shaped part.

12. Frame according to claim 10, wherein the lateral half-flanges are located inside the extension of the webs of the panel and mainly contain unidirectional fibers extending without discontinuity over the entire periphery of the panel.

13. Frame according to claim 12, wherein fabrics of multidirectional fibers prolong each lateral half-flange and form the webs of the panel.

14. Frame for a working hull, especially for the fuselage of an aircraft, wherein it has in part at least a monolithic structure constituted by a profile a made of a composite material formed of fibers with high mechanical resistance, said fibers being agglomerated by hardened synthetic resin and having as a section an internal flange, two external half-flanges and two webs connecting the internal flange to each external half-flange in such a way that the internal flange extends outward from the webs and that a recess open towards the outside of the frame is formed between the webs, the internal flange and the external half-flanges mainly being constituted by laps of unidirectional fibers extending longitudinally without discontinuity inside the profile, and the webs of the profile being formed by fabrics made up of multidirectional fibers and connecting the internal flange to each external half-flange.

* * * * *